Aug. 12, 1958

M. F. PETERS 2,847,035

FLUID CIRCUITRY

Filed Aug. 11, 1954

INVENTOR.
Melville F. Peters
BY
Martin J. Finnegan
ATTORNEY

с

United States Patent Office 2,847,035
Patented Aug. 12, 1958

2,847,035

FLUID CIRCUITRY

Melville F. Peters, Livingston, N. J.

Application August 11, 1954, Serial No. 449,202

6 Claims. (Cl. 138—30)

This invention relates to expansion chambers, and in particular to fluid circuitry having means incorporated therein to allow expansion of the volumetric capacity of a fluid circuit in certain circumstances.

In my patent application, Serial No. 416,463 filed March 16, 1954, I have described a bellows having two piston areas operating to change the volume of the bellows in response to a change in pressure, but without resort to any change in overall length. In my patent application, Serial No. 437,056 filed June 10, 1954 now abandoned, I have described a conduit which expands enough with increase in pressure to avoid the use of expansion chambers. There are installations, however, with short lengths of large diameter conduit that must confine the pressure changes to such small values that it is advantageous to use an expansion chamber. There are at times limitations on the installation and operation of the chamber such as space, vibration and high frequency surges which require an expansion chamber which must have close fluid coupling to the system and be symmetrical with the conduit. It is therefore the first object of the invention to put the expansion chamber in the line of flow of the fluid in the conduit.

Since the two bellows with unequal piston or effective areas can change in volume with a change in pressure without changing their overall length, it is a second object of the invention to make the expansive element of the expansion chamber from two bellows with unequal piston areas.

It is a third object of the invention to surround the flexible element with a fluid-tight chamber so that a failure of the flexible element will not allow the fluid in the system to escape.

It is a fourth object of the invention to pressurize the region between the bellows and the fluid-tight chamber, so that an increase in volume in the fluid system will decrease the volume in the region between the bellows and chamber and this decrease in volume will absorb energy from the fluid in the system by compressing the gases.

It is a fifth object of the invention to compress a spring alone, or in combination with the gases sealed between the bellows and the fluid-tight chamber to absorb the energy dissipated by the fluid when the rate of flow of fluid is changed.

It is a sixth object of the invention to replace the fluid-tight chamber surrounding the bellows with braid, so that the unit can be used both as an expansion chamber and a flexible connection between two vibrating or moving bodies.

It is a seventh object of the invention to replace the fluid-tight chamber surrounding the bellows with a bolt-spring arrangement so that the combination will change in volume with a change in pressure or temperature and will change in length with a change in temperature of the system, so that the unit combines the properties of an expansion chamber and an expansion joint.

When the combination of bellows is replaced with an elastomer bag it is necessary to confine or limit the expansion of the bag to a predetermined region, so that when it is pressurized it does not interfere with the flow of fluid in the conduit. This limiting envelope will consist of a fluid-tight casing which can be either rigid or flexible, and a tube in line with the conduit which permits the fluid to pass from one side to the other when the pressure differential across the tube is greater than zero, but will not permit the pressurized bag to penetrate an appreciable distance into the openings or pores reserved for the flow of fluid. It is therefore an eighth object of the invention to use an elastomer bag as the expansion element in the chamber and to limit the expansion of the bag to a given domain, and by the aid of valves or porous material to allow the fluid in the system to pass through one section of the domain and compress an elastomer bag.

It is a ninth object of the invention to cover the bellows with an elastomer braid or similar covering so that the expansion unit can serve as an expansion chamber, an expansion joint, and a flexible connection between vibrating bodies.

Figure 1:
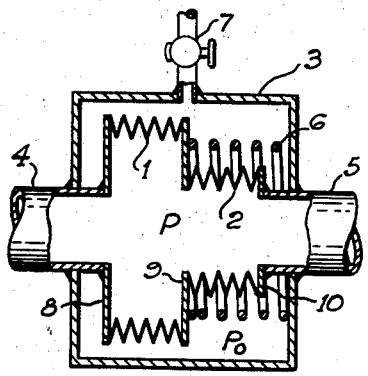
Fig. 1 is a cross-sectional view of an expansion chamber.
Figure 2:
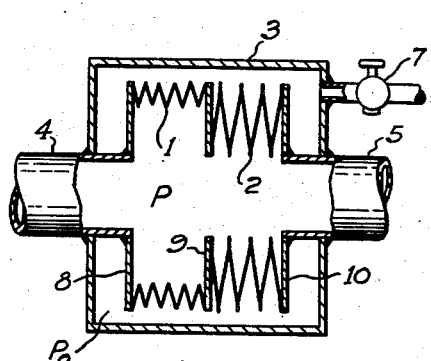
Fig. 2 is a cross-sectional view of an expansion chamber similar in action to the chamber shown in Fig. 1.
Figure 4:
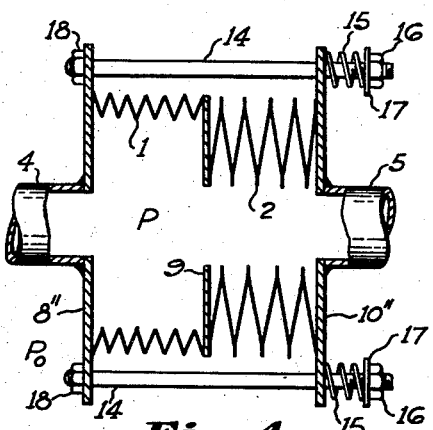
Figure 5:
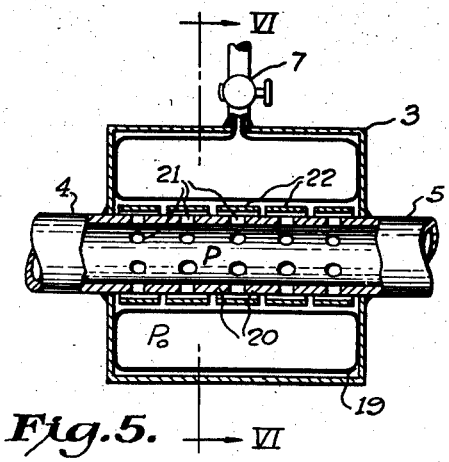
Figure 6:
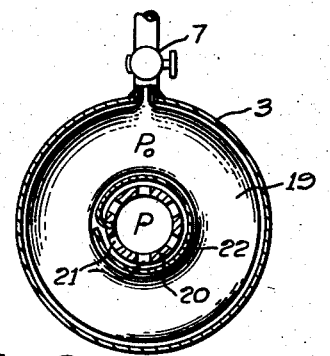

Fig. 4 is a cross-sectional view of an expansion unit which is similar in all respects to those of Figs. 1 and 2 except that the rigid chamber is replaced by a combination of bolts and springs; and Figs. 5 and 6 are cross-sectional views of an expansion unit having an elastomer bag for the flexible element and enveloping the bag is a combination of fluid-tight and non fluid-tight walls, an embodiment of the invention.

In Fig. 1 the two bellows 1 and 2 are enclosed in a hermetically sealed chamber 3. Bellows 1 has one end attached to the fixed plate 8 and the other end attached to plate 9, and bellows 2 (which has a smaller piston or effective area than bellows 1) has one end attached to plate 9 and the other end attached to fixed plate 10. The chamber 3 is pressurized through valve 7. The position of plate 9 is determined by the difference between the pressure P in the system and the stabilizing pressure $P_0$ and the force exerted by spring 6. When the pressure P is increased the force on plate 9 is increased so that bellows 2 is compressed and bellows 1 is elongated. When P is decreased the pressure $P_0$ and spring 6 acting on 9 compresses bellows 1 and elongates bellows 2. The movement of plate 9 with a change in pressure changes the volume so that the unit absorbs energy from the fluid with an increase in pressure P and returns energy with a decrease in pressure P. The fluid enters and leaves the bellows assembly through conduits 4 and 5.

In Fig. 2 the effective area of bellows 1 is made greater than the effective area of bellows 2 by making the inside diameter of bellows 1 greater than the inside diameter of bellows 2, and keeping the outside diameter of both bellows the same. With such an arrangement an increase in pressure will increase the volume of the expansion unit by compressing bellows 2 and elongating bellows 1.

Figure 3:
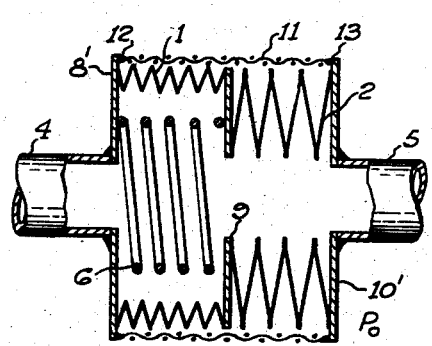
Fig. 3 is a cross-sectional view of an expansion unit which is similar in all respects to those of Figs. 1 and 2 except that the rigid chamber is replaced by a flexible construction.

The hermetically sealed chamber 3 shown in Figs. 1 and 2 can be replaced with the braid 11 shown in Fig. 3, or with any equivalent flexible covering. When resistance to twist and elongation are required, the braid may be fabricated from wire, and when great flexibility is required the braid can be replaced with elastomers or other non-metallic material. The braid or covering is secured to plates 8' and 10' at 12 and 13, respectively. When the covering 11 has elastic properties the unit performs the functions of an expansion chamber, an expansion joint, and a flexible conduit.

In Figure 4 the combination of bolts 14, springs 15, washers 17, and nuts 16 and 18 permits the assembly to act both as an expansion chamber and as an expansion joint.

Referring to Figures 5 and 6, the bellows assembly shown in Figures 1 to 4 is replaced by an elastomer bag 19 which is pressurized to a pressure $P_0$ through valve 7. When the operating pressure P is high, the stabilizing $P_0$ must be high, so that the expansion of 19 is limited by element 3 and the valve assembly 20, 21, and 22, so that the bag 19 is not damaged or forced into the conduit when P is reduced to zero. The valve assembly consists of a tube 20 with holes 21 and a sufficient number of circular strips 22 to cover the holes 21 when the pressure $P_0$ in 19 is greater than P, and to expand and uncover the holes so that the fluid can flow through the holes when the pressure P is greater than $P_0$. Alternatively, conduit 20 may be porous, or holes 21 much smaller.

What I claim is:

1. An expansion unit for fluid line interposition comprising, a fixed wall rigidly secured to each of the opposed ends of the fluid line, a covering around said end walls and forming a sealed chamber therewith, a centrally bored movable wall member within the chamber, a first bellows secured at one end to the fluid line and at its opposite end to one side of the movable wall, a second bellows secured at one end to the fluid line opposite the first bellows and at its other end to the opposite side of the movable wall member, said first and second bellows differing in their respective effective areas.

2. An expansion unit for fluid line interposition comprising, a fixed wall rigidly secured to each of the opposed ends of the fluid line, a covering around said end walls and forming a sealed chamber therewith, a source of pressure in communication with the chamber and the outer surfaces of the bellows, a valve in said pressure source, a centrally bored movable wall member within the chamber, a first bellows secured at one end to the fluid line and at its opposite end to one side of the movable wall, a second bellows secured at one end to the fluid line opposite the first bellows and at its other end to the opposite side of the movable wall member, said first and second bellows differing in their respective effective areas.

3. An expansion unit for fluid line interposition comprising, a fixed wall rigidly secured to each of the opposed ends of the fluid line, a covering around said end walls and forming a sealed chamber therewith, a centrally bored movable wall member within the chamber, a first bellows secured at one end to the fluid line and at its opposite end to one side of the movable wall, a second bellows secured at one end to the fluid line opposite the first bellows and at its other end to the opposite side of the movable wall member, said first and second bellows differing in their respective effective areas, and a spring member between the end wall and the movable wall on that side of the structure having the bellows of smaller effective area.

4. An expansion unit for fluid line interposition comprising, a fixed wall rigidly secured to each of the opposed ends of the fluid line, a covering around said end walls and forming a sealed chamber therewith, a centrally bored movable wall member within the chamber, a first bellows secured at one end to the fluid line and at its opposite end to one side of the movable wall, a second bellows secured at one end to the fluid line opposite the first bellows and at its other end to the opposite side of the movable wall member, said first and second bellows differing in their respective effective areas, and a coil spring member overlying the bellows between the end wall and the movable wall on that side of the structure having the bellows of smaller effective area.

5. An expansion unit for fluid line interposition comprising, a fixed wall rigidly secured to each of the opposed ends of the fluid line, a covering around said end walls and forming a sealed chamber therewith, a first fixed plate rigidly secured to one of the inner ends of the fluid line, a second fixed plate rigidly secured to the other inner end of the line, a centrally bored movable wall member within the chamber, a first bellows secured at one end to the first fixed plate on the fluid line and at its opposite end to one side of the movable wall, a second bellows secured at one end to the second fixed plate on the fluid line opposite the first bellows and at its other end to the opposite side of the movable wall member, said first and second bellows differing in their respective effective areas.

6. An expansion unit for fluid line interposition comprising, a fixed wall rigidly secured to each of the opposed ends of the fluid line, a covering around said end walls and forming a sealed chamber therewith, a source of pressure in communication with the chamber and the outer surfaces of the bellows, a valve in said pressure source, a first fixed plate rigidly secured to one of the inner ends of the fluid line, a second fixed plate rigidly secured to the other inner end of the line, a centrally bored movable wall member within the chamber, a first bellows secured at one end to the first fixed plate on the fluid line and at its opposite end to one side of the movable wall, a second bellows secured at one end to the second fixed plate on the fluid line opposite the first bellows and at its other end to the opposite side of the movable wall member, said first and second bellows differing in their respective effective areas, and a coil spring member overlying the bellows between the end wall and the movable wall on that side of the structure having the bellows of smaller effective area.

References Cited in the file of this patent

UNITED STATES PATENTS

| | | |
|---|---|---|
| 1,707,912 | Heindorf | Apr. 2, 1929 |
| 1,950,107 | Guinn et al. | Mar. 6, 1934 |
| 2,609,001 | Hebard | Sept. 2, 1952 |
| 2,677,393 | Cornelius | May 4, 1954 |
| 2,682,893 | Ziebold | July 6, 1954 |
| 2,735,642 | Norman | Feb. 21, 1956 |
| 2,768,647 | Stuart | Oct. 30, 1956 |

FOREIGN PATENTS

| | | |
|---|---|---|
| 279,846 | Great Britain | Aug. 23, 1928 |
| 646,891 | France | Nov. 16, 1928 |
| 667,144 | Germany | Nov. 5, 1938 |
| 838,672 | Germany | May 12, 1952 |